March 22, 1932.   J. E. STOLL   1,850,422
MARKING MECHANISM
Filed May 28, 1931
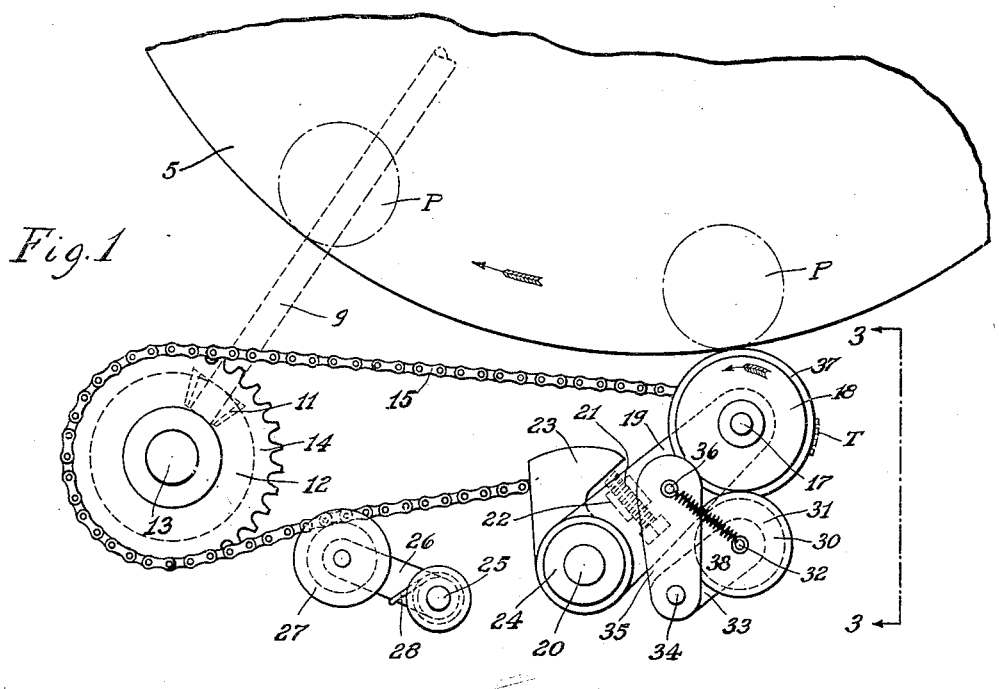
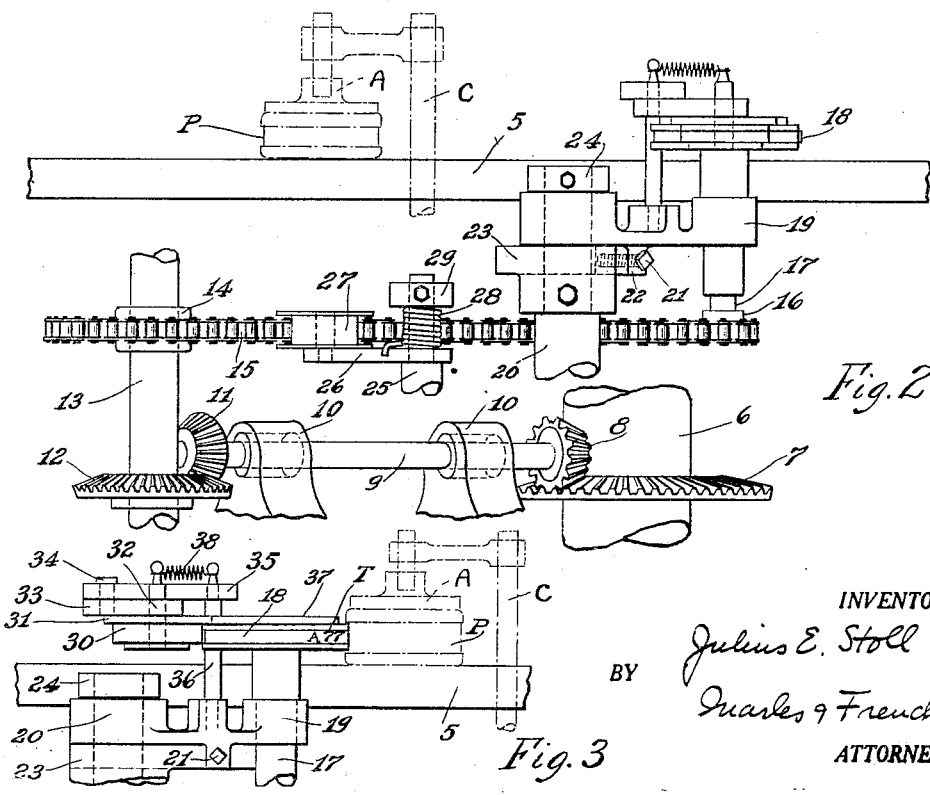
INVENTOR.
Julius E. Stoll
BY
Charles & French
ATTORNEYS Patented Mar. 22, 1932

1,850,422

UNITED STATES PATENT OFFICE

JULIUS E. STOLL, OF MILWAUKEE, WISCONSIN, ASSIGNOR TO PABST CORPORATION, OF MILWAUKEE, WISCONSIN, A CORPORATION OF WISCONSIN

MARKING MECHANISM

Application filed May 28, 1931. Serial No. 540,569.

The invention relates to marking apparatus.

In many instances it is desirable to give articles in a production line a number, a code designation or a date. For example in the manufacture of certain packaged food products, it is desirable to give each package a code designation or date to identify packages of one batch or day from another and in other instances it is desirable to consecutively number articles produced as they proceed along in production. The object of this invention is to provide a marking apparatus for printing identifying characters on articles or objects and which may be readily applied to a production machine in which the packages are carried around on a rotary conveyor or table and subjected to different operations while on this table, as for example, the application of a label to the package.

The invention further consists in the several features hereinafter set forth and more particularly defined by claims at the conclusion hereof.

In the drawings, Fig. 1 is a plan view of a marking apparatus embodying the invention;

Fig. 2 is a front elevation view of the apparatus;

Fig. 3 is an end elevation view of the apparatus looking from the direction of the line 3—3 in Fig. 1.

Referring to the drawings, the numeral 5 designates a rotary table or conveyor for the articles or packages such as the packages P to be marked and this table is suitably mounted on a standard 6 which is driven from any suitable source of power, not shown.

This standard 6, which carries the table, has a bevel gear 7 mounted thereon meshing with a bevel gear 8 on a lay shaft 9 rotatably mounted in bearings 10 and carrying a bevel gear 11 meshing with bevel gear 12 on a vertically disposed shaft 13 carrying a sprocket wheel 14 connected by a chain 15 to a sprocket wheel 16 on the vertically disposed shaft 17 that carries the printing or type wheel 18. In the present instance the ratio of the above described gearing is such that the printing wheel makes eight revolutions to one of the table 5 and this provides a sufficient arc of contact movement between the printing wheel 18 and the package P to print the type data T on the printing wheel upon the outer periphery of the package. In this connection it is to be noted that while the printing wheel is acting on the package that this package is clamped or as shown in Figs. 2 and 3 firmly held to the table by any suitable means such as a clamping member A mounted on a reciprocable rod C but inasmuch as this clamping mechanism in the present instance forms a part of the label applying mechanism which forms no part of the present invention, the details of the control for the rod C have not been shown but this clamping mechanism acts to hold the packages P in position on the table while being printed on, its being understood that the present invention is designed as an attachment that may be used with various forms of rotary conveyor machines.

The vertically disposed shaft 17 for the printing wheel 18 is mounted on the outer end of an arm 19 mounted to swing about a fixed standard 20, the inward swinging movement of said arm being limited by the engagement of a stop screw 21, adjustably mounted in a lug 22 on said arm, with a stop member 23 fixed to the standard 20, said arm being journalled on said standard between the hub of the member 23 and a collar 24 fixed to said standard.

A fixed post 25 has an arm 26 mounted to swing thereon and this arm carries a grooved wheel 27 at its outer end held in tensioned engagement with the chain 15 by means of a torsion spring 28 in the form of a coiled spring, one end of which is anchored to a collar 29 fixed to the post 25 and the other end of which engages the arm 26 and acts on said arm to press the wheel 27 inwardly thus providing an automatic chain tightener. At the same time, owing to the fact that the arm 19 is free to swing, the pressure exerted on said chain by this tightening device will also act to swing the arm 19 and the wheel 18 toward the table and thus move the wheel 18 into yielding printing contact with the package P.

For applying ink to the type matter on the printing wheel, I provide an inking disk 30 which may be of any suitable material impregnated or otherwise supplied with ink for example, a disk of felt which is mounted on an end plate 31 journalled on a shaft 32 carried in the outer end of an arm 33 mounted to swing about a pivot 34 on the outer end of an arm 35 mounted on its inner end upon a post 36 carried by the arm 19, said plate 31 being of larger diameter than the disk 30 and held in engagement with a part 37 of the printing wheel 18 by means of a spring 38 connected at its ends respectively to the post 36 and shaft 32. Thus the inking wheel is maintained in yielding driven engagement with the printing wheel so that as the printing wheel is revolved, the inking wheel will be turned, it being noted that the type matter T to receive the ink projects slightly from the face of said wheel and that the relation of the diameters of the plate 31 and 30 is such that inking disk only comes in contact with the faces of the type.

With the above construction it will be noted that as the table 5 revolves, the printing wheel 18 revolves in synchronism therewith but at a higher speed and that the data on said wheel is printed onto the package P as said package moves past and in printing contact with said wheel, which as has been heretofore explained is yieldingly pressed against the package through the action of the chain tensioning mechanism. Also since the printing wheel and inking wheel are yieldingly maintained in driving relation, the revolving of the printing wheel will also serve to turn the inking wheel and thus deposit a new supply of ink upon the type matter at every revolution of these parts, it being noted also that these wheels are of different diameters.

While the objects to be printed on are here shown as cylindrical objects, it will be understood that the printing apparatus above desired may act on objects having flattened sides presented to the printing wheel.

I desire it to be understood that this invention is not to be limited to any particular form or arrangement of parts except in so far as such limitations are included in the claims.

What I claim as my invention is:

1. In a printing mechanism for applying characters to objects carried upon a rotary conveyor, the combination of a printing wheel engageable with the objects, means for driving the printing wheel, and means for applying a yielding pressure to said driving means to yieldingly maintain said wheel in printing position.

2. In a printing mechanism for applying characters to objects carried upon a rotary conveyor, the combination of a swinging arm, a printing wheel mounted on the free end of said arm, means for driving said wheel including a flexible driving element, and means for tensioning said element and exerting a yielding pressure on said wheel through said driving element and arm.

3. In a printing mechanism for applying characters to objects carried upon a rotary conveyor, the combination of a movable support, a printing wheel rotatably mounted on said support, means for driving said wheel including a flexible driving element, and means for tensioning said element and moving said support into a printing position for said wheel.

4. In a printing mechanism for applying characters to objects carried upon a rotary conveyor, the combination of a swinging arm, a printing wheel mounted on the free end of said arm, means for driving said printing wheel including a flexible driving element, means for tensioning said element and urging said arm into a printing position for said wheel, a rotatable inking member, and means for supporting said inking member on said arm in operative relation to said printing wheel.

5. In a printing mechanism for applying characters to objects carried upon a rotary conveyor, the combination of a swinging arm, a printing wheel mounted on the free end of said arm, means for driving said printing wheel including a flexible driving element, means for tensioning said element and urging said arm into a printing position for said wheel, a rotatable inking member, means for swingingly supporting said inking member on said arm, and means for yieldingly urging said inking member into driven relation with said printing wheel.

In testimony whereof, I affix my signature.

JULIUS E. STOLL.